US009283717B2

(12) United States Patent
Jiang et al.

(10) Patent No.: US 9,283,717 B2
(45) Date of Patent: Mar. 15, 2016

(54) METHOD FOR PRODUCING AN OPHTHALMIC LENS COMPRISING A BASE LENS AND A FILM STRUCTURE

(75) Inventors: Peiqi Jiang, St. Petersburg, FL (US); Bruce Keegan, St. Petersburg, FL (US)

(73) Assignee: Essilor International (Compagnie Generale D'Optique), Charenton le Pont (FR)

( * ) Notice: Subject to any disclaimer, the term of this patent is extended or adjusted under 35 U.S.C. 154(b) by 219 days.

(21) Appl. No.: 13/992,208

(22) PCT Filed: Dec. 8, 2010

(86) PCT No.: PCT/US2010/059537
§ 371 (c)(1),
(2), (4) Date: Jun. 6, 2013

(87) PCT Pub. No.: WO2012/078152
PCT Pub. Date: Jun. 14, 2012

(65) Prior Publication Data
US 2013/0255860 A1    Oct. 3, 2013

(51) Int. Cl.
*B29D 11/00* (2006.01)
*B29D 11/02* (2006.01)

(52) U.S. Cl.
CPC ...... *B29D 11/00125* (2013.01); *B29D 11/0073* (2013.01)

(58) Field of Classification Search
CPC .................. B29D 11/00125; B29D 11/0073
USPC ......................................... 156/154, 212–214
See application file for complete search history.

(56) References Cited

U.S. PATENT DOCUMENTS

| 7,581,832 B2 * | 9/2009 | Begon et al. ................ 351/49 |
| 2005/0226955 A1 | 10/2005 | Yuasa et al. |
| 2008/0036964 A1 | 2/2008 | Miura et al. |
| 2009/0283924 A1 | 11/2009 | Jiang et al. |
| 2011/0195239 A1 | 8/2011 | Takane et al. |

FOREIGN PATENT DOCUMENTS

| JP | 2009-113353 A * | 5/2009 |
| WO | 2006/105999 A1 | 10/2006 |
| WO | 2007/133208 A1 | 11/2007 |
| WO | 2007/144308 A1 | 12/2007 |
| WO | 2010/053862 A1 | 5/2010 |
| WO | 2011/053329 A1 | 5/2011 |
| WO | 2011/075112 A1 | 6/2011 |

OTHER PUBLICATIONS

Machine translation of JP 2009-113353, 17 pages, date unknown.*

* cited by examiner

*Primary Examiner* — Jeff Aftergut
(74) *Attorney, Agent, or Firm* — Norton Rose Fulbright US LLP

(57) ABSTRACT

A method for producing an ophthalmic lens comprised of a base lens and a film structure bound to said base lens includes a pressure-free heating. Said heating is performed after assembling the film structure with a semi-finished lens (1), and before said semi-finished lens is machined for obtaining the base lens. Although a maximum heating temperature is higher than a glass-transition temperature of the semi-finished lens, no image distortion and optical aberration is produced for the final ophthalmic lens. The maximum heating temperature is also lower than a glass-transition temperature of the film structure.

16 Claims, 2 Drawing Sheets

METHOD FOR PRODUCING AN OPHTHALMIC LENS COMPRISING A BASE LENS AND A FILM STRUCTURE

TECHNICAL FIELD

The invention relates to a method for producing an ophthalmic lens comprising a lens and a film structure.

BACKGROUND OF THE INVENTION

Ophthalmic lenses have already been proposed, which are comprised of a base lens and a film which is laminated on an optical surface of the base lens. The film has two parallel external surfaces. Then the optical dioptre function of the ophthalmic lens depends on the shape of the surface of the base lens which supports the film. As a consequence, any change in the shape of the base lens surface with respect to a target surface results in optical defects such as image distortions or optical aberrations. Such distortions and aberrations are most significant in a center zone of the lens, and may lead to discarding the final product. Production yield is then reduced.

But the production method of the final ophthalmic lens generally includes one or several heating steps. Such heating step may be necessary for implementing adhesive means for retaining the film on base lens, or for providing the resulting ophthalmic lens with an additional hardcoating or functionalizing coating. Due to stresses internal to the film, the film may vary in shape during the heating step, and because it is adhered to the lens base, the surface of this latter may be altered. Thus image distortions and/or optical aberrations may appear for the ophthalmic lens. The internal stresses of the film may have various causes, including its own production method and a preforming step for providing the film with curvature when the film-receiving surface of the base lens is curved. Then it is known, in particular from the international patent application PCT/US2009/067820, to perform a first heating of the film before it is assembled with the base lens, up to a maximum pre-assembling temperature which is higher than the maximum temperature of a post-assembling heating step which is performed after the film structure has been connected to the base lens. Such pre-assembling heating of the film reduces its internal stresses, so that the base lens is less altered in curvature values during the post-assembling heating step.

However, the pre-assembling heating step may still cause image distortions or optical aberrations for the final ophthalmic lens. Indeed, the maximum temperature of the post-assembling heating step may be high, depending on the function of this post-assembling heating. In particular, hardcoating and/or some of the functionalizing coatings used require post-assembling heating temperatures which are higher than the glass-transition temperature of the base lens. Because this glass-transition temperature is exceeded, the base lens is changed in shape and curvature values, thus causing image distortions and optical aberrations again.

Therefore, an object of the present invention is to provide ophthalmic lenses each comprised of a base lens and a film structure, which are less altered in shape and curvature values during a post-assembling heating step with maximum temperature higher than the glass-transition temperature of the base lens.

Another object of the invention is to provide such ophthalmic lens devoid of image distortion and optical aberration, although it is heated above the glass-transition temperature of the corresponding base lens after the film has been assembled with the base lens.

Still another object of the invention is to manufacture such ophthalmic lenses with improved production yield while meeting the quality requirements of the ophthalmic applications.

SUMMARY OF THE INVENTION

For these purposes and others, the invention proposes a new method for producing an ophthalmic lens which comprises a base lens and a film structure bound to a first optical surface of the base lens, with the method comprising the following steps:

/1/ obtaining a semi-finished lens, having the first optical surface and a temporary surface opposed to each other;

/2/ obtaining the film structure; and

/3/ applying the film structure onto the first optical surface of the semi-finished lens, with layered connecting means arranged therebetween.

Step /3/ is performed using a pressing device for producing pressure so as to push the film structure and the first optical surface of the semi-finished lens against each other. The invention method is characterized in that it further comprises the following steps performed with the chronological order indicated:

/4/ after step /3/ and after pressure has been removed: heating the semi-finished lens with the film structure connected thereto, up to a maximum heating temperature which is higher than a glass-transition temperature of a constituting material of the semi-finished lens and less than another glass-transition temperature of a material of the film structure; and /5/ after step /4/: machining the temporary surface of the semi-finished lens so as to obtain a second optical surface opposed to the first optical surface, thereby producing the base lens comprised in the ophthalmic lens, with the machining causing the base lens to be thinner than the semi-finished lens between the first optical surface and the second optical surface or temporary surface, respectively.

Thanks to the maximum heating temperature used in step /4/ being higher than the glass-transition temperature of the semi-finished lens, this heating without pressure is efficient for stabilizing the semi-finished lens. In this way, internal stresses which could exist before within the semi-finished lens are relaxed, thereby avoiding that the first optical surface be altered later on, in particular during the machining of step /5/ or any further heating of the ophthalmic lens.

Because the post-assembling heating of step /4/ is carried out before the semi-finished lens is machined on its temporary surface, the semi-finished lens is still thick enough during step /4/ for not warping or changing in curvature values of the first optical surface, although the heating temperature is higher than the glass-transition temperature of the semi-finished lens.

Also because the temporary surface of the semi-finished lens is machined after the post-assembling heating, the curvature values of the second optical surface of the base lens are not altered by this post-assembling heating.

In addition, because the maximum heating temperature in step /4/ is below the glass-transition temperature of the film structure, this latter does not suffer dimensional change.

Furthermore, the heating performed in step /4/ may increase the adhesion strength of the connecting means with both the semi-finished lens and the film structure, compared to the adhesion strength existing just after step /3/. Put another way, the adhesion strength of the film structure to the semi-finished lens may be higher after step /4/ than between steps /3/ and /4/. The heating of step /4/ may also eliminate assembling defects such as bubbles trapped between the semi-finished lens and the film structure, possibly present at the end of step /3/.

Possibly, step /3/ may further comprise heating the semi-finished lens and the film structure while the pressure pushes them against each other, so that the film structure remains connected to the semi-finished lens between steps /3/ and /4/ after pressure has been removed. In such case, the semi-finished lens and the film structure may be heated in step /3/ up to another maximum heating temperature while the pressure is implemented. Then, the maximum heating temperature used in step /4/ may be higher than or equal to this latter another maximum heating temperature used in step /3/. As a consequence, the another maximum heating temperature of step /3/ is also less than the glass-transition temperature of the film structure material. Preferably, it may also be less than any other heating temperature which may be implemented after step /4/ in the lens production process.

In both cases where the maximum heating temperature of step /4/ is higher than that of step /3/ or equal to this latter, a heating time used in step /3/ is shorter than a reference heating time at the maximum heating temperature used in step /4/.

According to an improvement of the invention, the method may further comprise the following steps:

/6/ after step /4/ or /5/: providing the ophthalmic lens with a coating on the film structure, or on the second optical surface of the base lens, or on both the film structure and the second optical surface of the base lens; and then /7/ curing the ophthalmic lens provided with the coating up to a maximum curing temperature, with the maximum heating temperature used in step /4/ being higher than or equal to the maximum curing temperature used in this step /7/.

If the maximum curing temperature of step /7/ is equal to the maximum heating temperature of step /4/, then the heating time used in step /4/ may be longer than a curing time used in step /7/.

If the maximum heating temperature of step /4/ is higher than the maximum heating temperature of step /7/, the heating time used in step /4/ may be same as the curing time used in step /7/.

Thanks to the heating performed in step /4/ with maximum temperature equal to or higher than that of step /7/, the semi-finished lens or the base lens is stable in shape during step /7/. So step /7/ does not produce image distortion and optical aberration either, and the yield production can be important as a consequence.

BRIEF DESCRIPTION OF THE DRAWINGS

Other features and advantages of the invention will appear from the non-limiting embodiments which are now described in connection with the following figures.

For sake of clarity, the elements represented in these figures are not sized in relation with actual dimensions, nor with ratios of actual dimensions.

DETAILED DESCRIPTION OF PREFERRED EMBODIMENTS

Figure 1:
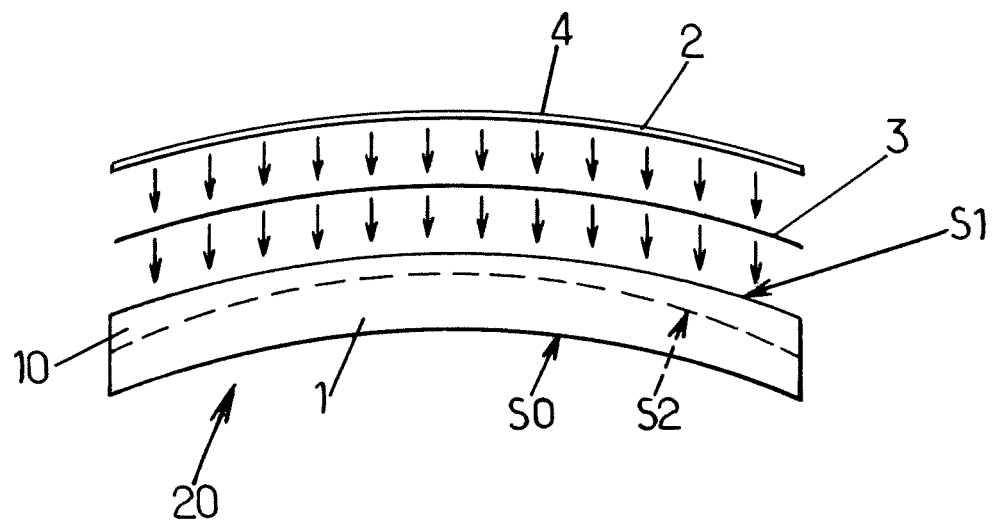
FIG. 1 illustrates an ophthalmic lens structure as considered in the present invention.

According to FIG. 1, an ophthalmic lens comprises two main components: a base lens 10 and a film structure 2. Reference number 20 denotes generally the ophthalmic lens as a whole.

As usual in ophthalmics, the base lens 10 is obtained from a semi-finished lens 1 with two surfaces which are opposed to one another. One of these surfaces, so-called first optical surface, is created directly with a final shape during the semi-finished lens manufacturing. Thus, this surface initially has curvature values which are compatible with final optical features of the ophthalmic lens to be produced from the semi-finished lens. For example, the first optical surface may be the front convex surface S1 of the base lens 10 in the final ophthalmic lens 20, and it is determined by the shape of the mould used for casting the semi-finished lens. It may be a complex surface, with mean sphere and cylinder values varying from one point to another within the surface S1. For example, the curvature of the optical surface S1 at a reference point may correspond to a base value of between 1.5 and 4 diopters. The other surface of the semi-finished lens 1, which is denoted S0, is temporary and intended to be machined later according to an ophthalmic prescription of a lens wearer. A second optical surface S2 is created in this way from the temporary surface S0 by a machining step. In the resulting lens, the optical surfaces S1 and S2 cooperate for producing a desired optical power distribution together with a prescription astigmatism value. During the machining step, a lens thickness is reduced by removing material from the semi-finished lens 1 with the machining tool, starting from the temporary surface S0 until the optical surface S2 is created. For example, the thickness of the semi-finished lens 1 near an optical center of the optical surface S1 may be about 6 to 12 mm (millimeter), whereas the thickness of the base lens 10 at the same measurement point may be about 1.2 to 3 mm.

The material of the semi-finished lens 1 may be any one used in ophthalmics. In particular, the invention may be implemented with a lens material which has a low glass-transition temperature. In preferred implementations of the invention, this glass-transition temperature of the lens constituting material may be of between 60° C. and 90° C. For example, the constituting material of the semi-finished lens may be a thermosetting plastic epi-sulfide material, with light-refracting index of between 1.70 and 1.76. Alternatively, it may also be a thermosetting plastic polythio-urethane material with light-refracting index of between 1.60 and 1.67.

The film structure 2 may be of single-layer or multilayer structure. For example, it may comprise a first triacetyl cellulose-based layer (TAC layer). Then, a glass-transition temperature of the film structure which relates to the first TAC layer may be higher than or equal to 120° C.

Figure 2:
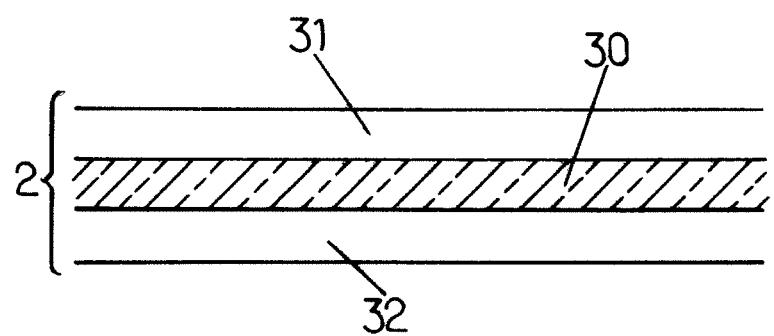
FIG. 2 is a cross-sectional view of a film structure which can be used for an ophthalmic lens in accordance with FIG. 1.

One interesting application of the invention is to provide the final ophthalmic lens 20 with light-polarizing function. To this end, the film structure 2 may comprise further to the first TAC layer, a light-polarizing polyvinyl alcohol-based layer (PVA layer) and a second TAC layer. The light-polarizing PVA layer is then laminated between the TAC layers, so that these latter act as protecting layers on both sides of the PVA layer. Such film structure is known in particular from patent application PCT/US09/62923, and is represented in FIG. 2.

Reference numbers 30, 31 and 32 respectively denote the light-polarizing PVA layer, and first and second TAC layers. The thickness of layer 30 may be about 40 μm (micrometer) and that of each one of layers 31 and 32 may be about 80 μm, for example.

The film structure 2 may have been preformed to a curved shape compatible with that of the first optical surface S1 of the semi-finished lens 1. Processes suitable for such film preforming step are well-known, so that it is not necessary to repeat them here.

The film structure 2 is retained on the first optical surface S1 of the semi-finished lens 1 using layered connecting means. These connecting means are represented schematically by a layer 3 in FIG. 1, but they may have actually several embodiments depending on their implementation. In particular, the layered connecting means may comprise at least one latex adhesive layer, possibly combined with a hot-melt adhesive layer. A first possible structure for the connecting means 3 is comprised of two latex adhesive layers which are initially deposited on the first optical surface S1 and on the film structure 2, respectively. Then, they are pressed against each other for assembling the semi-finished lens 1 with the film structure 2. A second possible structure for the layered connecting means 3 may be obtained by replacing one of the latex adhesive layers of the first structure with a hot-melt adhesive layer. Such structure for the connecting means is known from WO 2010/053862 for example. A third possible structure is also obtained from the first one, by adding a hot-melt adhesive layer between both latex adhesive layers. A tri-layer structure for the connecting means 3 is thus obtained, as proposed in PCT/US09/62923.

Several processes may be used with the invention for assembling the film structure 2 onto the first optical surface S1 of the semi-finished lens 1. All these processes use pressure for pushing the film structure 2 and the first optical surface S1 against each other with the layered connecting means 3 arranged therebetween.

A first one of these assembling processes is described in WO 2006/105999. In this first process, a peripheral edge of the film structure is maintained firmly above a carrier supporting the semi-finished lens. The lens carrier is mounted on a piston arranged for pressing the semi-finished lens against the film structure from below, with the first optical surface facing the film structure. The assembling device also comprises a resilient stamp arranged above the film structure, in line with the semi-finished lens. Then, the application of the film structure onto the semi-finished lens is performed by a moving sequence of both the resilient stamp and the semi-finished lens towards each other, thereby producing the application pressure.

A second assembling process compatible with the invention is described in WO 2007/133208 for example. In this second process, the semi-finished lens, the connecting means and the film structure are stacked between a rigid lower part forming a base support and a rigid upper part, with a fixed separating distance between the lower and upper parts. The upper part is provided with an inflatable membrane which pushes down the film structure against the semi-finished lens when being inflated with gas pressure.

A third assembling process is described in US 2009/0283924. In this third process, a mold used for casting the semi-finished lens is opened after the semi-finished lens material has cooled down enough so as to retain its shape. Then, the film structure provided with the connecting means is placed in the mold above the first optical surface, and the mold is closed again. Suitable temperature in the mold together with an adjusted clamp force causes the semi-finished lens contacting the film structure intimately and the connecting means producing an effective bonding.

A fourth assembling process is described in WO 2007/144308. This fourth process uses the same application device as the first one, but without involving the resilient stamp. However, the piston-movable carrier with the semi-finished lens thereon is arranged within a hermetically sealed enclosure. The film structure forms a resilient sealing of the enclosure above the semi-finished lens. In this latter process, the upward translation of the semi-finished lens is combined with a variation of the gas pressure inside the enclosure for performing a progressive application of the film structure onto the semi-finished lens.

Depending on the assembling process used, the pressure implemented for applying the film structure onto the semi-finished lens may be in the range of 0.1 bar to 30 bars.

During at least some of these assembling processes, the semi-finished lens and the film structure may be heated while pressure is implemented for ensuring that the connecting means produce a minimum adhesion with both the semi-finished lens and the film structure. Thus, the semi-finished lens and the film structure remain assembled with one another when the pressure is removed. Such heating used during pressure time is optional, and is different from the subsequent pressure-free heating step introduced by the invention and now described.

After the pressure has been removed, the semi-finished lens with the film structure is heated up to a maximum temperature between the respective glass-transition temperatures of the semi-finished lens and the film structure, assuming that the glass-transition for the film structure occurs at higher temperature than that for the semi-finished lens. For example, the maximum temperature for this post-assembling pressure-free heating step may be between 80° C. and 130° C., with a heating time of between 1 and 6 hours inclusive. Such post-assembling pressure-free heating step may be performed using an oven of standard type. Because the semi-finished lens is thick compared to the film structure, the shape of the first optical surface does not change. Thus, this post-assembling pressure-free heating step does not create image distortion and optical aberration for the final ophthalmic lens to be obtained.

A first effect of the post-assembling pressure-free heating step is to relax at least part of the internal stresses which could exist before within the semi-finished lens. Then, because the semi-finished lens is thus stabilized, the shape of its first optical surface will not be altered later on in the production method. The implementation examples which are now listed illustrate this first effect:

Example 1

The adhesive system for the film lamination was described in patent application PCT/US09/62923. A 1.74 index semi-finished lens with 3.75 base was washed and UV treated with H bulb of Fusion UV equipment at the conveyer speed of 1.22 m/min (meter per minute) and then coated by latex and hot-melt adhesive. The polarized film with 4.0 base curve was also washed and caustic treated, and then was coated by the same latex. After drying of both latex and hot-melt adhesives, the film and lens were laminated in a lamination equipment at 1.38 bars and 80° C. for 2 minutes and 30 seconds. After lamination, the semi-finished film-laminated lens was then post-annealed in air oven at 100° C. for 6 hours. After that, the semi-finished lens was surfaced to plano profile with a center thickness of 1.5 mm and then further coated with a hardcoating cured at 100° C. for 3 hours. The obtained lens exhibits no lens center distortion seen by eye through reflection light based on cosmetics inspection standard used in ophthalmics.

Comparative Example 1

Example 1 was repeated with no post-assembling heating step. The obtained plano lens has important lens center distortion seen under same observation conditions.

Example 2

Example 1 was repeated except the lens base is 2.75 base and initially machined to prescribed power value of −1.0 diopter with same center thickness of 1.5 mm. The obtained lens exhibits no lens center distortion seen by eye through reflection light based on the same cosmetics inspection standard.

Comparative Example 2

Example 2 was repeated with no post-assembling heating step. The obtained lens corresponding to −1.0 diopter power prescription has important lens center distortion seen under same observation conditions.

Example 3

Example 1 was repeated except the post-assembling heating conditions were 100° C. for 3 hours. The obtained lens exhibits no lens center distortion seen by eye through reflection light based on the same cosmetics inspection standard.

Comparative Example 3

Example 2 was repeated with post-assembling heating step at 80° C. for 6 hours. The obtained −1.0 diopter lens exhibits slight lens center distortion seen under same observation conditions.

Example 4

Example 1 was repeated except the post-assembling condition were 130° C. for 3 hours. The obtained lens exhibits no lens center distortion seen by eye through reflection light based on the same cosmetics inspection standard.

A second effect of the post-assembling pressure-free heating step may be to make application defects possibly present at the end of the assembling step disappear. Such application defects which are thus cleared off may be bubbles trapped by the connecting means, peeling away of the connecting means from the lens peripheral edge, etc.

Then, a third effect of the post-assembling pressure-free heating step may be to increase the adhesion strength of the film structure onto the semi-finished lens. Table 1 hereafter show adhesion improvement produced by the post-assembling pressure-free heating step. The film structure used for these data is a tri-layer TAC-PVA-TAC polarized film.

TABLE 1

|  | No post-assembling pressure free heating | | post-assembling pressure-free heating step at 100° C. during 6 hours | |
| --- | --- | --- | --- | --- |
| Adhesive layer on the film | | | latex | |
| Adhesive layer on the lens | Latex adhesive | Hot-melt adhesive | Latex adhesive | Hot-melt adhesive |

TABLE 1-continued

|  | No post-assembling pressure free heating | | post-assembling pressure-free heating step at 100° C. during 6 hours | |
| --- | --- | --- | --- | --- |
| Peeling force | 8.6 newtons | 18 newtons | >30-35 newtons | 25-35 newtons |

The peeling force values reported in the last line of Table 1 have been measured with identical operating conditions so that comparisons between these values are meaningful. Actually, a peeling strength higher than 25 newtons is sufficient to ensure a good behavior of the assembly during the rest of the lens manufacturing, including the edging step where the ophthalmic lens is trimmed off. Because of the improvement of the adhesion strength when using the post-assembling pressure-free heating step, it is possible to use connecting means limited to two adhesive layers instead of a three-layer structure as used in PCT/US09/62923. Easier implementation is thus possible. For example, the connecting means may comprise only a latex-based adhesive layer located on the film side and a second adhesive layer on the lens side which may be either latex-based or hot-melt-based.

In addition, the two samples reported in the two last columns of Table 1, with using the post-assembling pressure-free heating step, do not exhibit image distortion or optical aberration. Most particularly a center zone of the lens is devoid of such defects.

The semi-finished lens 1 is then machined at the temporary surface S0 using one of the machining processes known in ophthalmics, so as to obtain the final second optical surface S2 of the base lens 10 included in the assembly.

Figure 3:
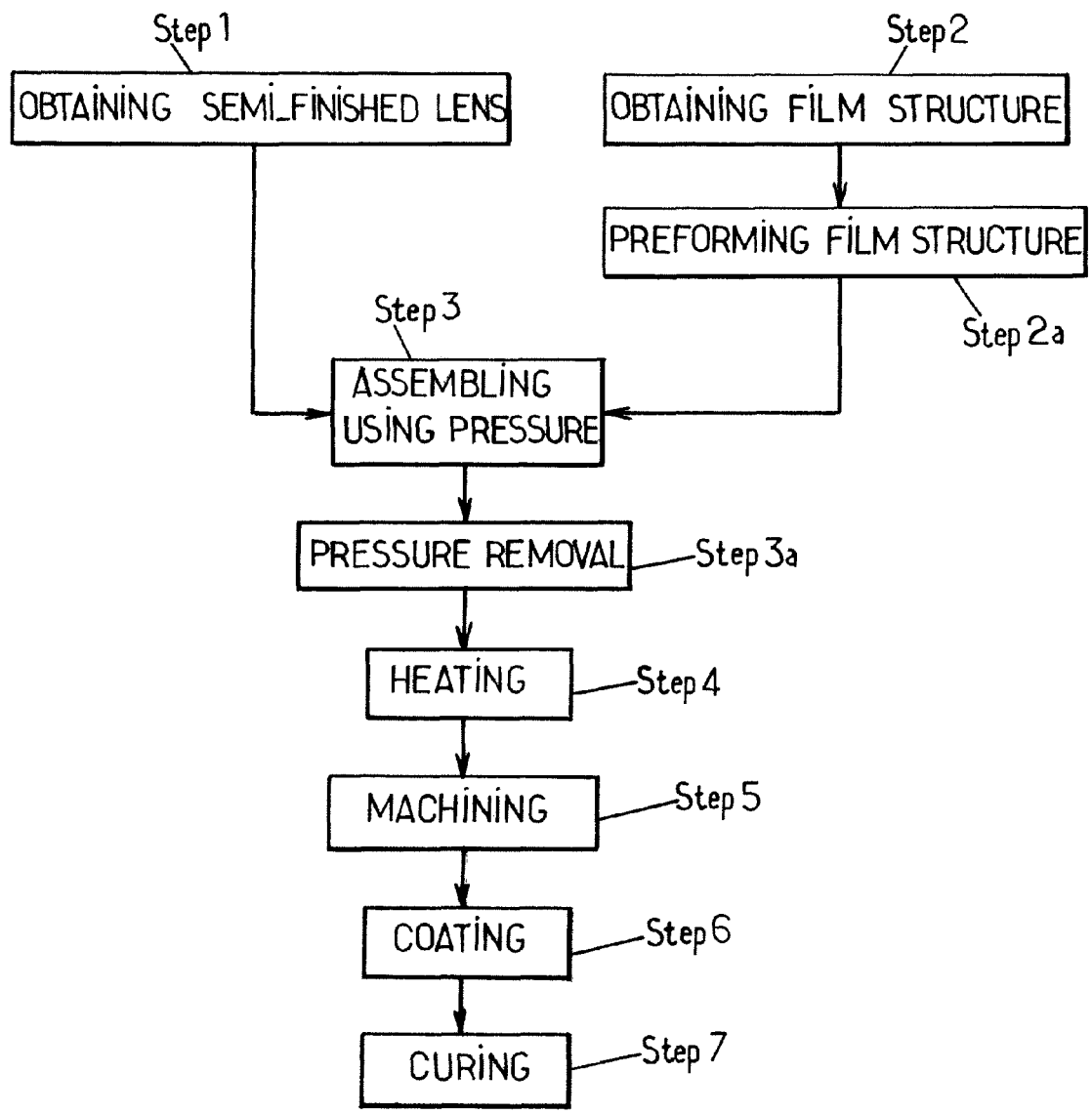
FIG. 3 is a block diagram of a lens production method according to the invention.

FIG. 3 indicates the step sequence of a lens production method according to the invention. The following references denote the steps now summarized:
Step 1: supplying the semi-finished lens 1,
Step 2: supplying the film structure 2,
Step 2*a*: optionally preforming the film structure 2 if its initial shape is not compatible with that of the first optical surface S1 of the semi-finished lens 1,
Step 3: assembling the semi-finished lens 1 with the film structure 2 using pressure,
Step 3*a*: removing the pressure used for the assembling Step 3,
Step 4: post-assembling pressure-free heating of the assembly;
Step 5: machining of the temporary surface S0 of the semi-finished lens 1.

Further Step 6 and Step 7 are optional, and intended for supplying the ophthalmic lens 20 with a coating either on the exposed surface of the film structure 2, or the second optical surface S2 of the base lens 10, or both. Such coating is commonly used in the art, and one can refer to any one of the numerous documents available about this subject-matter. Reference number 4 in FIG. 1 indicates the possible location of such coating on the film structure 2, on a side opposed to the semi-finished lens 1, although the coating of concern is not present before Step 3, Step 3*a* and Step 4 have been all completed. The coating provided in Step 6 may comprise a hardcoating, a functionalizing coating, or a superposition of a hard coating and a functionalizing coating provided on the hard coating. In a known manner, the hardcoating may comprise a varnish layer designed for increasing a hardness of the film structure or second optical surface. The functionalizing coating may be an anti-reflecting coating, a scratch-resistant coating, an anti-soiling coating, an antistatic coating, etc.

Also known, the coating which is provided in Step 6 may be a combination of several of the coatings listed above, for obtaining a final lens with multiple added functions.

For these added functions to be effective, it may be necessary to cure the ophthalmic lens provided with the coating. The maximum curing temperature implemented in Step 7 is then lower than or equal to the maximum heating temperature used in Step 4, not to cause residual stresses which would have remained within the base lens to relax. The heating Step 4 at higher temperature thus ensures that the base lens 10 does not suffer any shape alteration during the curing Step 7. For example, the maximum curing temperature of Step 7 may be of between 80° C. and 120° C., with a heating time of between 1 and 3 hours inclusive.

When the optional coating Step 6 and curing Step 7 are implemented, the machining Step 5 may be performed either before Step 6 as represented in FIG. 3, or after Step 7, or also between Step 6 and Step 7.

The invention claimed is:

1. A method for producing an ophthalmic lens including a base lens and a film structure bound to a first optical surface of said base lens, the method comprising:
   /1/ obtaining a semi-finished lens, having the first optical surface and a temporary surface opposite to said first optical surface;
   /2/ obtaining the film structure;
   /3/ applying the film structure onto the first optical surface of the semi-finished lens, with layered connecting means arranged between said film structure and said first optical surface of the semi-finished lens;
   step /3/ being performed using a pressing device for producing pressure so as to push the film structure and the first optical surface of the semi-finished lens against each other;
   /4/ after step /3/ and after pressure has been removed: heating the semi-finished lens with the film structure connected to said semi-finished lens, up to a maximum heating temperature which is higher than a glass-transition temperature of a constituting material of the semi-finished lens and less than another glass-transition temperature of a material of the film structure; and
   /5/ after step /4/: machining the temporary surface of the semi-finished lens so as to obtain a second optical surface opposite to the first optical surface, thereby producing the base lens comprised in the ophthalmic lens, the machining causing said base lens to be thinner than the semi-finished lens.

2. A method according to claim 1, wherein step /3/ further comprises heating the semi-finished lens and the film structure while the pressure pushes said film structure and said semi-finished lens against each other, so that the film structure remains connected to the semi-finished lens between steps /3/ and /4/ after the pressure has been removed.

3. A method according to claim 2, wherein the semi-finished lens and the film structure are heated in step /3/ up to another maximum heating temperature while the pressure pushes said film structure and said semi-finished lens against each other, and the maximum heating temperature used in step /4/ is higher than or equal to said another maximum heating temperature used in step /3/.

4. A method according to claim 3, wherein a heating time used in step /3/ is shorter than a reference heating time at the maximum heating temperature used in step /4/.

5. A method according to claim 3, wherein the maximum heating temperature used in step /4/ is higher than said another maximum heating temperature used in step /3/.

6. A method according to claim 1, wherein an adhesion strength of the film structure to the semi-finished lens is higher after step /4/ than between steps /3/ and /4/.

7. A method according to claim 1, wherein the layered connecting means used in step /3/ comprise at least one latex adhesive layer.

8. A method according to claim 7, wherein the layered connecting means used in step /3/ further comprise a hot-melt adhesive layer.

9. A method according to claim 1, further comprising:
   /6/ after step /4/ or /5/: providing the ophthalmic lens with a coating on the film structure, or on the second optical surface of the base lens, or on both the film structure and the second optical surface of the base lens; and then
   /7/ curing the ophthalmic lens provided with said coating up to a maximum curing temperature, with the maximum heating temperature used in step /4/ which is higher than or equal to the maximum curing temperature used in said step /7/.

10. A method according to claim 9, wherein the coating provided in step /6/ comprises a hardcoating, a functionalizing coating, or a superposition of a hard coating and a functionalizing coating provided on said hard coating.

11. A method according to claim 9, wherein the maximum curing temperature of step /7/ is between 80° C. and 120° C., with a heating time of between 1 and 3 hours inclusive.

12. A method according to claim 1, wherein the film structure comprises a first triacetyl cellulose-based layer, with said film structure has a glass-transition temperature higher than or equal to 120° C.

13. A method according to claim 12, wherein the film structure further comprises a light-polarizing polyvinyl alcohol-based layer and a second triacetyl cellulose-based layer, said light-polarizing polyvinyl alcohol-based layer being laminated between the first and second triacetyl cellulose-based layers.

14. A method according to claim 1, wherein the glass-transition temperature of the material of the semi-finished lens is between 60° C. and 90° C.

15. A method according to claim 14, wherein the material of the semi-finished lens is a thermosetting plastic epi-sulfide material with light-refracting index of between 1.70 and 1.76, or a thermosetting plastic polythio-urethane material with light-refracting index of between 1.60 and 1.67.

16. A method according to claim 14, wherein the maximum heating temperature of step /4/ is between 80° C. and 130° C., with heating time of between 1 and 6 hours inclusive.

* * * * *